United States Patent
Kondou et al.

(10) Patent No.: US 11,964,634 B2
(45) Date of Patent: Apr. 23, 2024

(54) WIPER CONTROL METHOD AND WIPER CONTROL APPARATUS

(71) Applicant: MAZDA MOTOR CORPORATION, Hiroshima (JP)

(72) Inventors: Keisuke Kondou, Hiroshima (JP); Ippei Yamauchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 335 days.

(21) Appl. No.: 17/407,867

(22) Filed: Aug. 20, 2021

(65) Prior Publication Data
US 2022/0063563 A1    Mar. 3, 2022

(30) Foreign Application Priority Data
Aug. 27, 2020   (JP) ................................. 2020-143626

(51) Int. Cl.
*B60S 1/04*    (2006.01)
(52) U.S. Cl.
CPC ........... *B60S 1/0455* (2013.01); *B60S 1/0402* (2013.01)
(58) Field of Classification Search
None
See application file for complete search history.

(56) References Cited

U.S. PATENT DOCUMENTS

| | | | | |
|---|---|---|---|---|
| 2010/0306948 A1* | 12/2010 | Tisch | ......................... | B60S 1/08 15/250.31 |
| 2013/0119911 A1* | 5/2013 | Karcher | ..................... | B60S 1/08 318/474 |
| 2018/0086310 A1* | 3/2018 | Gage | ...................... | B60S 1/0866 |

FOREIGN PATENT DOCUMENTS

JP    2015-196464 A    11/2015

* cited by examiner

*Primary Examiner* — Natasha N Campbell
*Assistant Examiner* — Pradhuman Parihar
(74) *Attorney, Agent, or Firm* — Studebaker & Brackett PC

(57) ABSTRACT

A wiper control technique is provided that can prevent a windshield from being damaged by a falling wiper blade during a wiper parking operation, even when a wiper arm is in a retreat position where the blade is raised and held away from the windshield. In one embodiment, the wiper arm is stopped for a predetermined time interval at a predetermined pause position when the wiper arm is positioned above a parked position and at the retreat position during the wiper parking operation, while the wiper arm is being swung downward toward a lower reversal position. The pause position is a position at which the wiper arm is able to fall toward the windshield to return to a base position. After a lapse of the predetermined time interval, the wiper arm is swung to the parked position.

8 Claims, 10 Drawing Sheets

WIPER CONTROL METHOD AND WIPER CONTROL APPARATUS

TECHNICAL FIELD

The present disclosure relates to a windshield wiper control method and a windshield wiper control apparatus.

BACKGROUND

Conventional wiper systems used for vehicles such as automobiles include a wiper apparatus that has a configuration capable of performing an operation of moving a wiper blade away from a windshield (front window), i.e., performing lock back of the wiper blade, in order to prevent accumulation of foreign matters such as snow and dust between the wiper blade and the windshield while the vehicle is stopped, or for replacement of the wiper blade. The lock back is performed by an operation of bending a wiper arm in the normal direction of the windshield (the direction rising from the windshield) and thereby moving the wiper blade away from the windshield.

However, in the case of a full-concealed type wiper apparatus, whose wiper is parked at a position concealed by a back end of an engine hood when not in use, the wiper arm cannot be locked back because the wiper interferes with the back end of the engine hood when the wiper is at the parked position.

Hence, a wiper control apparatus for full-concealed type wiper apparatuses is proposed that is capable of stopping a wiper arm for a predetermined time interval at an upper reversal position at which the wiper arm can be locked back, as disclosed in Japanese Patent Laid-Open No. 2015-196464. During to-and-fro movement of the wiper between the upper reversal position and a lower reversal position, this wiper control apparatus stops the wiper arm at the upper reversal position for a predetermined time interval, so that the wiper arm can be easily locked back at the upper reversal position by turning off the engine with the wiper arm positioned at the upper reversal position.

SUMMARY

With the above wiper control apparatus disclosed in Japanese Patent Laid-Open No. 2015-196464, if a wiper parking operation is performed by a predetermined operation (e.g., turning on the engine) in the state where the wiper arm is raised from the windshield and locked back at the upper reversal position, the windshield might be damaged by an end portion of the wiper blade.

That is, in the case of the full-concealed type wiper apparatus, if the wiper arm in the lock-back state swings about a pivot shaft from the upper reversal position to the parked position concealed by the back end of the engine hood, the wiper arm interferes with the back end of the engine hood as it returns near the parked position. This causes the wiper arm to fall toward the windshield. At this time, if the wiper arm continues to swing toward the parked position while falling toward the windshield, the wiper blade provided at a distal end of the wiper arm might contact the back end of the engine hood (see FIG. 10), which might cause the wiper blade to twist and fall toward the windshield. In this case, there is fear that the end portion of the wiper blade, e.g., a hard portion such as a cap attached to a distal end of the wiper blade, contacts the windshield and the windshield is damaged by the impact of the contact.

The present disclosure has been made to solve this problem and aims to provide a wiper control method and a wiper control apparatus that can prevent the windshield from being damaged by falling of the wiper blade during the wiper parking operation even when the wiper arm is in the lock back state.

A wiper control method of the present disclosure is for controlling a wiper apparatus including a wiper having a wiper blade that wipes a windshield of a vehicle and a wiper arm that has the wiper blade attached thereto, and is capable of swinging about a predetermined pivot shaft along a surface of the windshield together with the wiper blade; and a drive part that causes the wiper to swing along the surface of the windshield to-and-fro between a predetermined upper reversal position and a predetermined lower reversal position, wherein the wiper apparatus has a configuration capable of enabling lock back whereby the wiper arm is moved from a base position at which the wiper blade is made to contact the windshield, to a retreat position at which the wiper blade is raised and held away from the windshield, and capable of parking the wiper into a predetermined parked position located below the lower reversal position and between a back end of an engine hood and the windshield. The method comprises stopping the wiper arm for a predetermined time interval at a predetermined pause position when the wiper arm is positioned above the parked position and at the retreat position during a parking operation of parking the wiper into the parked position while the wiper arm is being swung downward toward the lower reversal position, the pause position being a position at which the wiper arm is able to fall toward the windshield to return to the base position; and swinging the wiper arm to the parked position after a lapse of the predetermined time interval.

With this feature, even when the wiper arm is in the lock-back state, i.e., the state where the wiper arm is at the retreat position with the wiper blade raised and held away from the windshield, the wiper arm can be stopped for a predetermined time interval at the predetermined pause position located above the parked position during the parking operation of parking the wiper into the parked position between the back end of the engine hood and the windshield and while the wiper arm is being swung downward toward the lower reversal position. Thus, during the predetermined time interval, the wiper arm can fall from the retreat position toward the windshield and return to the base position at which the wiper blade contacts the windshield, and then the wiper arm can be swung to the parked position to move the wiper blade to the parked position.

When the wiper arm falls toward the windshield to return from the retreat position to the base position, the wiper arm is not swinging toward the parked position. This avoids a situation where the wiper blade contacts the back end of the engine hood. This in turn avoids a situation where the wiper blade is twisted by contact with the back end of the engine hood and falls toward the windshield, preventing contact between an end portion of the wiper blade (e.g., a cap at the distal end of the wiper blade) and the windshield and preventing any damage to the windshield that may otherwise result from an impact of the contact.

Preferably, in the above wiper control method, the pause position is located within a predetermined range at or below a position at which the wiper arm comes to a contacting state with respect to the back end of the engine hood when the wiper arm at the retreat position swings toward the parked position.

With this feature, during the parking operation when the wiper arm is in the lock-back state, i.e., at the retreat position, and is swung downward toward the lower reversal position and then reaches the pause position, the wiper arm can contact the back end of the engine hood and fall from the retreat position toward the base position. This eliminates the need for a special mechanism to cause the wiper arm to fall toward the windshield.

Preferably, in the above wiper control method, the predetermined range is set to a range within which the wiper arm receives, upon contacting the back end of the engine hood, a reaction force equal to or greater than a predetermined magnitude from the back end of the engine hood toward the windshield.

With this feature, the wiper arm at the pause position receives the reaction force from the back end of the engine hood, and this ensures that the wiper arm falls toward the windshield.

Preferably, the above wiper control method further includes urging the wiper arm from the retreat position to the base position with urging means provided to the wiper arm when the wiper arm at the retreat position receives the reaction force from the back end of the engine hood.

With this feature, the wiper arm not only receives the reaction force from the back end of the engine hood but also receives urging force from the urging means. This more reliably ensures that the wiper arm falls toward the windshield.

Preferably, in the above wiper control method, the predetermined range is set to a range within which the wiper blade does not contact the back end of the engine hood when the wiper arm falls toward the windshield to return to the base position.

With this feature, torsion of the wiper blade and any resultant damage to the windshield can be reliably prevented.

A wiper control apparatus of the present disclosure comprises a wiper including a wiper blade that wipes a windshield of a vehicle and a wiper arm that has the wiper blade attached thereto and is capable of swinging about a predetermined pivot shaft along a surface of the windshield together with the wiper blade, the wiper having a configuration capable of enabling lock back whereby the wiper arm is moved from a base position at which the wiper blade is made to contact the windshield, to a retreat position at which the wiper blade is raised and held away from the windshield; a drive part that causes the wiper to swing along the surface of the windshield to and from between a predetermined upper reversal position and a predetermined lower reversal position; and a controller that controls driving of the drive part. The controller controls the drive part to perform a parking operation of parking the wiper into a predetermined parked position located below the lower reversal position and between a back end of an engine hood and the windshield, controls the drive part to stop the wiper arm for a predetermined time interval at a predetermined pause position when the wiper arm is positioned above the parked position and at the retreat position during the parking operation and while the wiper arm is being swung downward toward the lower reversal position, the pause position being a position at which the wiper arm is able to fall toward the windshield to return to the base position, and controls the drive part to swing the wiper arm to the parked position after a lapse of the predetermined time interval.

With this feature, even when the wiper arm is in the lock-back state, i.e., the state where the wiper arm is at the retreat position with the wiper blade raised and held away from the windshield, the drive part can by controlled by the controller to stop the wiper arm for a predetermined time interval at the predetermined pause position located above the parked position during the parking operation of parking the wiper into the parked position between the back end of the engine hood and the windshield and while the wiper arm is being swung downward toward the lower reversal position. Thus, during the predetermined time interval, the wiper arm can fall from the retreat position toward the windshield and return to the base position at which the wiper blade contacts the windshield, and then the wiper arm can be swung to the parked position to move the wiper blade to the parked position.

When the wiper arm falls toward the windshield to return from the retreat position to the base position, the wiper arm is not swinging toward the parked position. This avoids a situation where the wiper blade contacts the back end of the engine hood. This in turn avoids a situation where the wiper blade is twisted by contact with the back end of the engine hood and falls toward the windshield, preventing contact between an end portion of the wiper blade (e.g., a cap at the distal end of the wiper blade) and the windshield and preventing any damage to the windshield that may otherwise result from an impact of the contact.

Preferably, in the above wiper control apparatus, the pause position is located within a predetermined range at or below a position at which the wiper arm comes to a contacting state with respect to the back end of the engine hood when the wiper arm at the retreat position swings toward the parked position.

With this feature, during the parking operation when the wiper arm in the lock-back state, i.e., at the retreat position is swung downward toward the lower reversal position and then reaches the pause position, the wiper arm can contact the back end of the engine hood and fall from the retreat position toward the base position. This eliminates the need for a special mechanism to fall the wiper arm toward the windshield.

Preferably, in the above wiper control apparatus, the predetermined range is set to a range within which the wiper arm receives, upon contacting the back end of the engine hood, reaction force equal to or greater than a predetermined magnitude from the back end of the engine hood toward the windshield.

With this feature, the wiper arm at the pause position receives the reaction force from the back end of the engine hood, and this ensures that the wiper arm falls toward the windshield.

Preferably, the above wiper control apparatus further includes urging means that is provided to the wiper arm and urges the wiper arm from the retreat position to the base position when the wiper arm at the retreat position receives the reaction force from the back end of the engine hood.

With this feature, the wiper arm not only receives the reaction force from the back end of the engine hood but also receives urging force from the urging means. This more reliably ensures that the wiper arm falls toward the windshield.

Preferably, in the above wiper control apparatus, the predetermined range is set to a range within which the wiper blade does not contact the back end of the engine hood when the wiper arm falls toward the windshield to return to the base position.

With this feature, torsion of the wiper blade and any resultant damage to the windshield can be reliably prevented.

The wiper control method and the wiper control apparatus of the present disclosure can prevent the windshield from being damaged by falling of the wiper blade during the wiper parking operation even when the wiper arm is in the lock back state.

DETAILED DESCRIPTION

Figure 1:
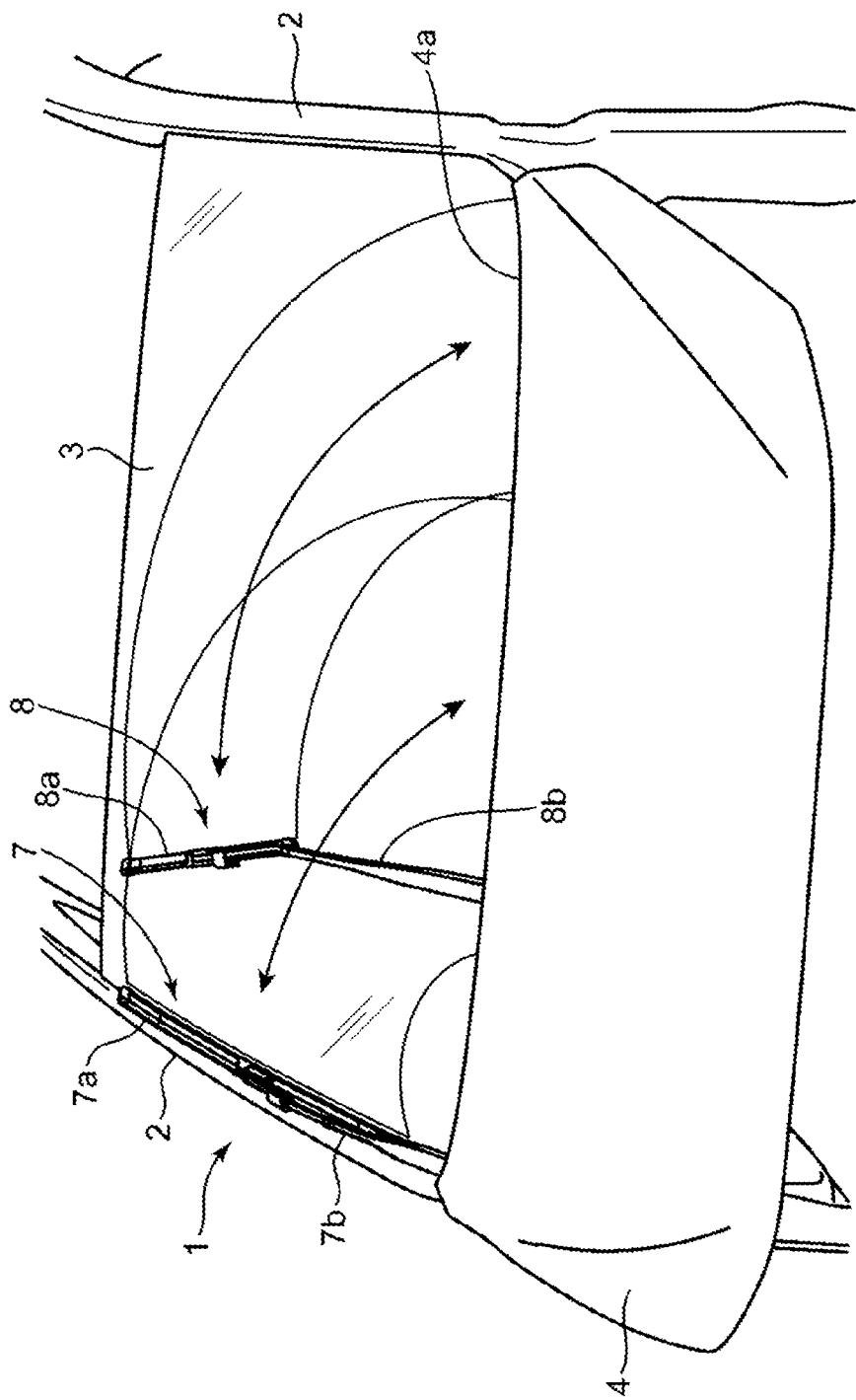
FIG. 1 is an enlarged perspective view of a front portion of a vehicle having the wiper control apparatus according to one embodiment of the present disclosure.
Figure 2:
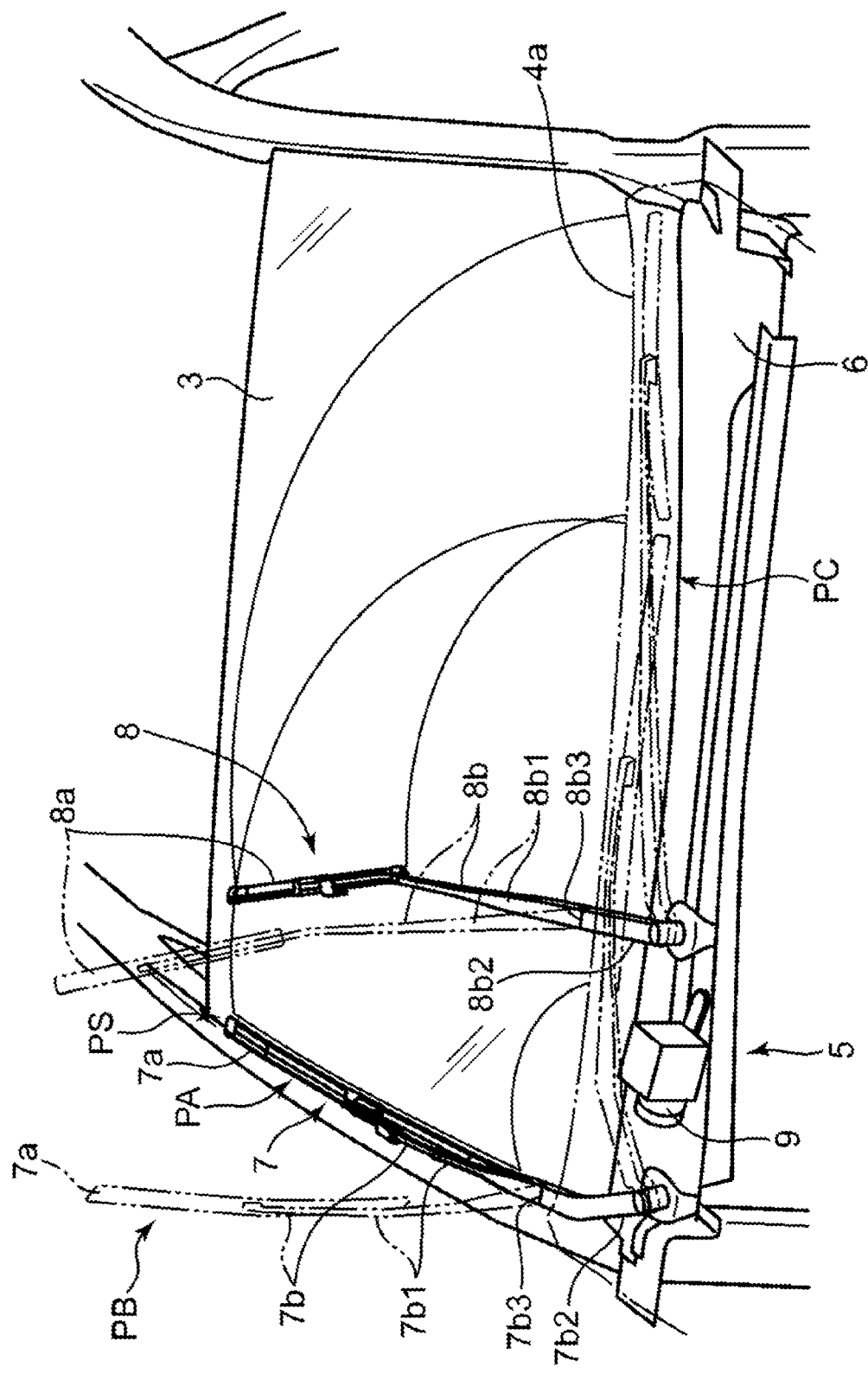
FIG. 2 is an enlarged perspective view of a movable part of the wiper control apparatus and a windshield, with an engine hood of the vehicle in FIG. 1 removed.

FIGS. 1 and 2 illustrate a vehicle 1 equipped with a wiper control apparatus 5 of the present embodiment. The wiper control apparatus 5 has a configuration capable of controlling driving of two wipers that wipe a windshield 3 (front window) on the front side of the vehicle 1, namely a first wiper 7 and a second wiper 8. The windshield 3 is mounted between a pair of front pillars 2 spaced apart from each other in a vehicle width direction. The first wiper 7 and the second wiper 8 each have a configuration capable of being locked back, namely being raised and held away from the windshield 3 by a user's manual operation. The wiper control apparatus 5 has a configuration capable of controlling a full-concealed type wiper apparatus, namely a configuration capable of parking the first wiper 7 and the second wiper 8 into a position below a back end 4a of the engine hood 4 when they are not in use.

Figure 3:
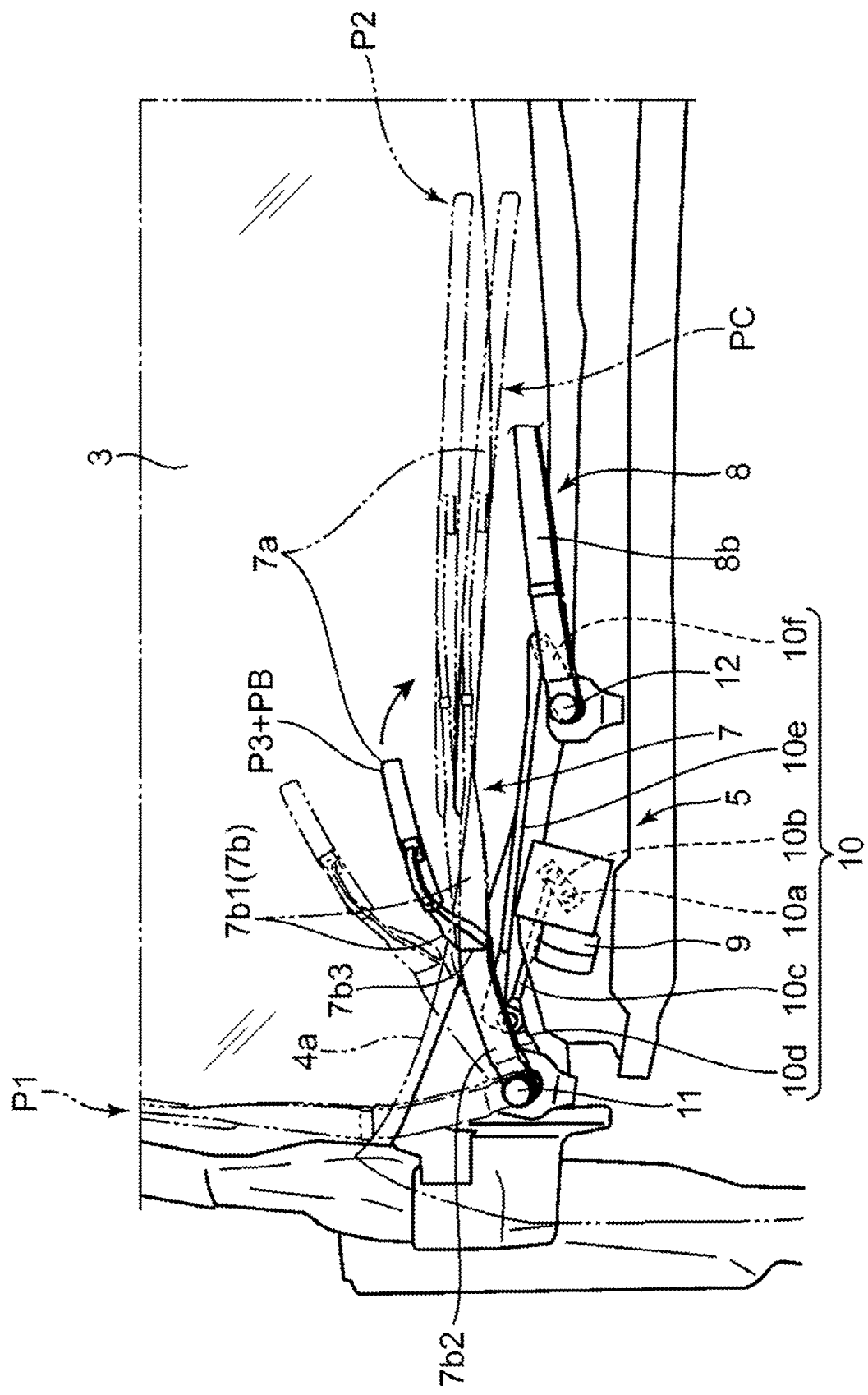
FIG. 3 illustrates a process in which a first wiper in FIG. 2 in the lock-back state is stopped for a predetermined time interval at a pause position above a parked position, in the wiper control method according to one embodiment of the present disclosure.
Figure 4:
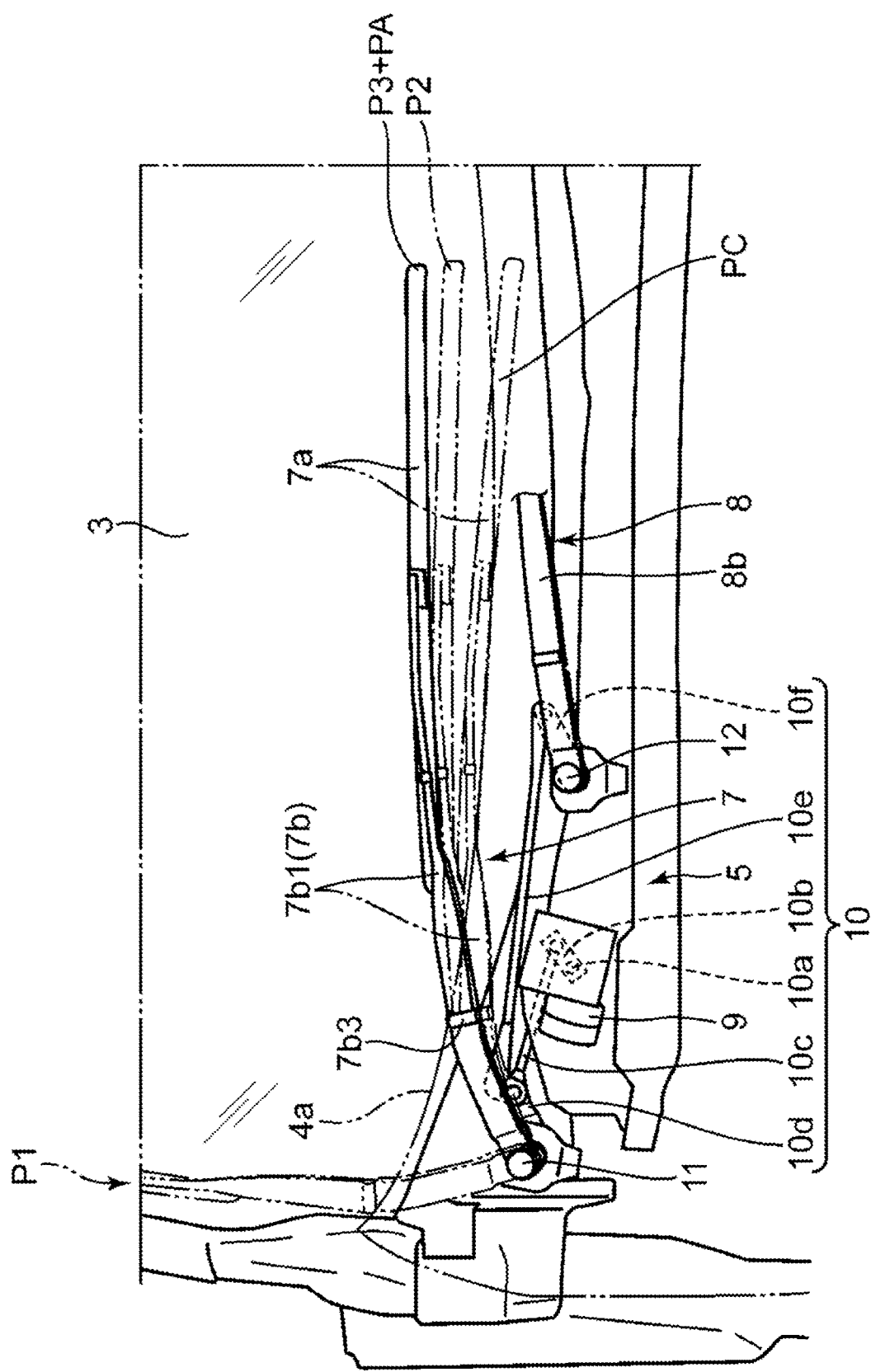
FIG. 4 illustrates a process in which the first wiper in FIG. 2 in the lock-back state falls at the pause position toward the windshield, in the wiper control method according to one embodiment of the present disclosure.

As shown in FIGS. 2-4, the wiper control apparatus 5 of the present embodiment includes a basic configuration of a wiper apparatus including the wipers and a drive part. Specifically, the wiper control apparatus 5 includes, as movable parts, the first wiper 7 and the second wiper 8, a drive part 9 composed of an electric motor as a driving source that causes the first wiper 7 and the second wiper 8 to swing to and fro along the surface of the windshield 3, and a link mechanism 10 that converts rotational driving force generated from the drive part 9 into driving force for a to-and-fro swinging motion and transmits it to the first wiper 7 and the second wiper 8. The wiper control apparatus 5 further includes a controller 21, an ignition switch 22, and a wiper switch 23 shown in FIG. 8 as control parts.

The first wiper 7, the second wiper 8, the drive part 9, and the link mechanism 10 described above are mounted on a vehicle body component 6 (e.g., a cowl grille) at its portion near a driver's seat (e.g., a left portion in FIGS. 2-4 in the case of Japanese vehicles). The vehicle body component 6 is positioned behind and below the back end 4a of the engine hood 4. The vehicle body component 6 extends in the vehicle width direction and connects the pair of front pillars 2.

Description of the First Wiper 7

As shown in FIGS. 2-5, the first wiper 7 includes a wiper blade 7a that wipes the windshield 3 and a wiper arm 7b having the wiper blade 7a attached to its distal end. The wiper arm 7b is capable of swinging about a predetermined first pivot shaft 11 along the surface of the windshield 3 together with the wiper blade 7a. The first pivot shaft 11 has the wiper arm 7b fixed thereto and is rotatably mounted on the vehicle body component 6 in FIGS. 2-4 near its left end portion proximate the driver's seat.

The first wiper 7 has a configuration enabling lock back whereby the wiper arm 7b is moved from a base position PA (see FIGS. 2 and 4) at which the wiper blade 7a is made to contact the windshield 3, to a retreat position PB (see FIGS. 2 and 3) at which the wiper blade 7a is raised and held away from the windshield 3. Specifically, the wiper arm 7b is configured to bend in the normal direction (outward direction) of the windshield 3, and more specifically, the wiper arm 7b includes a distal end portion 7b1, a proximal end portion 7b2, and a hinge portion 7b3 providing a hinge connection between the distal end portion 7b1 and the proximal end portion 7b2. The distal end portion 7b1 is capable of swinging about the hinge portion 7b3 in a direction rising from the windshield 3.

By receiving via the link mechanism 10 the rotational driving force generated from the drive part 9, the first wiper 7 is capable of swinging about the first pivot shaft 11 over a predetermined range along the surface of the windshield 3. Specifically, as shown in FIGS. 2-5, the first wiper 7 is capable of swinging over an angular range of 90 degrees or more between a service position PS closest to the left side edge of the windshield 3 and a parked position PC below the back end 4a of the engine hood 4. Also, the first wiper 7 is capable of swinging to and from continuously or intermittently between an upper reversal position P1 and a lower reversal position P2.

Here, the service position PS is located closer to the left side edge of the windshield 3 than the upper reversal position P1 is; the service position PS is a position at which the first wiper 7 is substantially parallel to the front pillar 2 and at which the first wiper 7 can be easily locked back by the user holding the first wiper 7 by hand from the lateral side of the vehicle. The parked position PC is located below the lower reversal position P2; the parked position PC is a position at which the first wiper 7 can be concealed by the back end 4a of the engine hood 4 while the first wiper 7 is laid substantially horizontally.

As shown in FIGS. 3 and 4, a pause position P3 (described later) may be any position at which the wiper arm 7b can fall from the retreat position PB, which is raised from the windshield 3, toward the base position PA. The pause position P3 of the present embodiment is located above the lower reversal position P2.

For example, the lower reversal position P2 may be located above the parked position PC by about 3 degrees of swing of the wiper arm 7b about the first pivot shaft 11.

For example, the pause position P3 may be located above the parked position PC by about 5.5 degrees of swing of the wiper arm 7b about the first pivot shaft 11.

Figure 5:
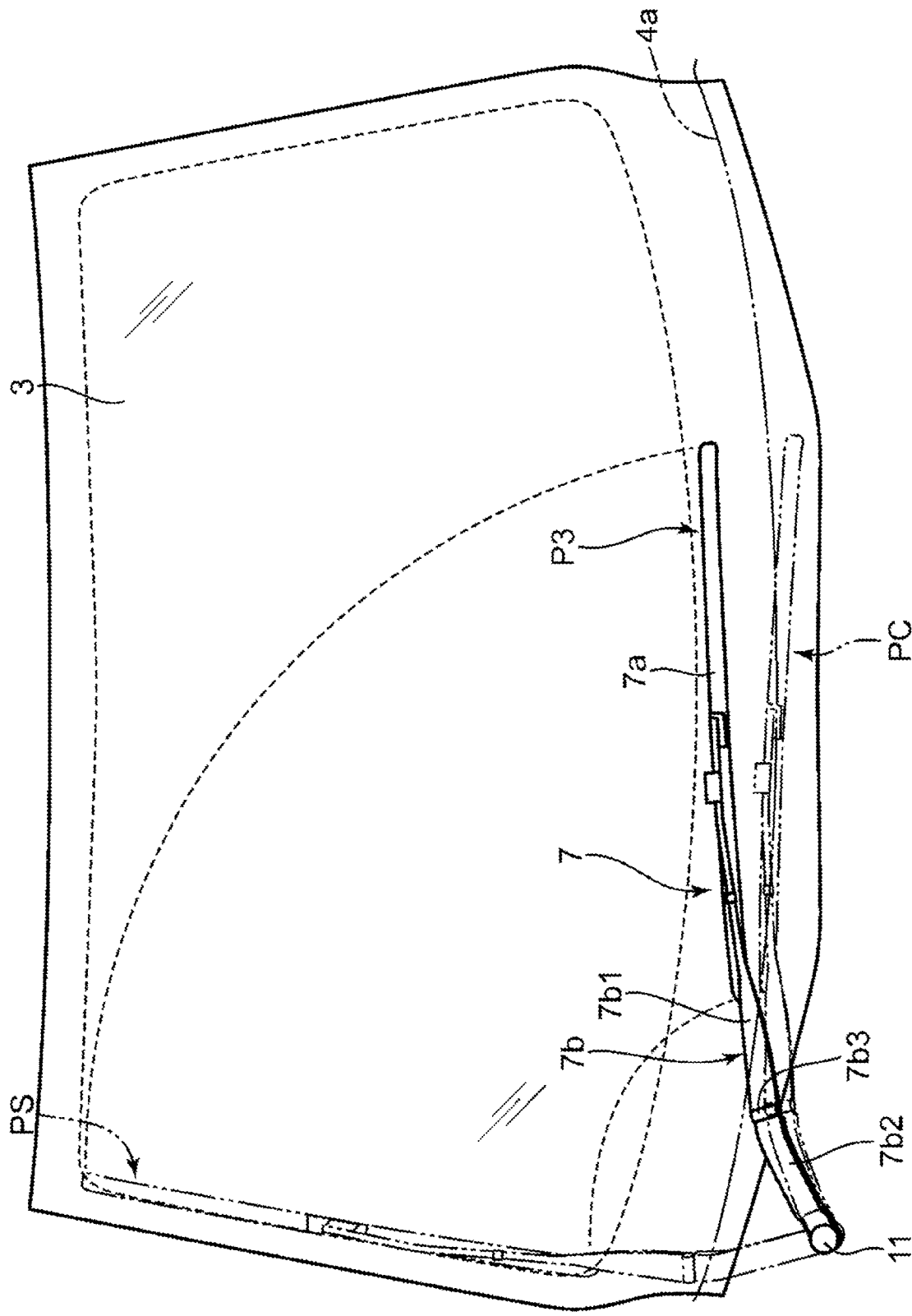
FIG. 5 illustrates the first wiper in FIG. 2 being positioned at a service position, the pause position, and the parked position, in the wiper control method according to one embodiment of the present disclosure.

At the pause position P3 of the present embodiment, when the first wiper 7 is in the lock-back state, the back end 4a of the engine hood 4 contacts the distal end portion 7b1, which is located on the distal end side of the wiper arm 7b relative to the hinge portion 7b3, as shown in FIG. 5. At this time, the portion of the back end 4a of the engine hood 4 at which the back end 4a contacts the distal end portion 7b1 extends in a direction that is oblique to an extending direction of the hinge portion 7b3 (i.e., a direction traversing the wiper arm 7b). This ensures that the contact between the back end 4a and the distal end portion 7b1 takes place.

Figure 6:
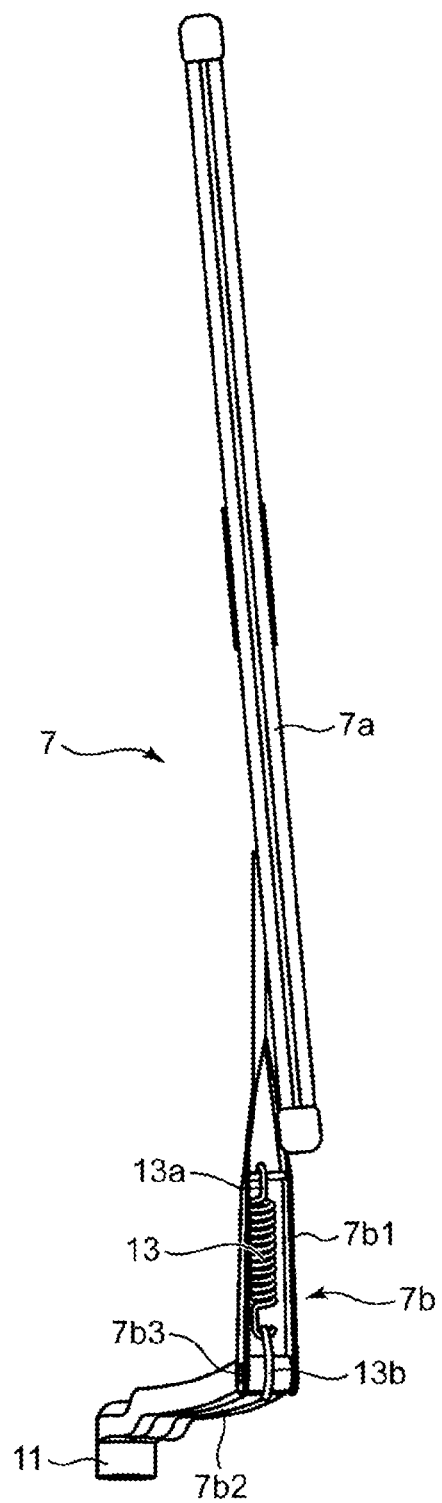
FIG. 6 is an enlarged perspective view of the first wiper in FIG. 2 in the lock-back state.
Figure 7:
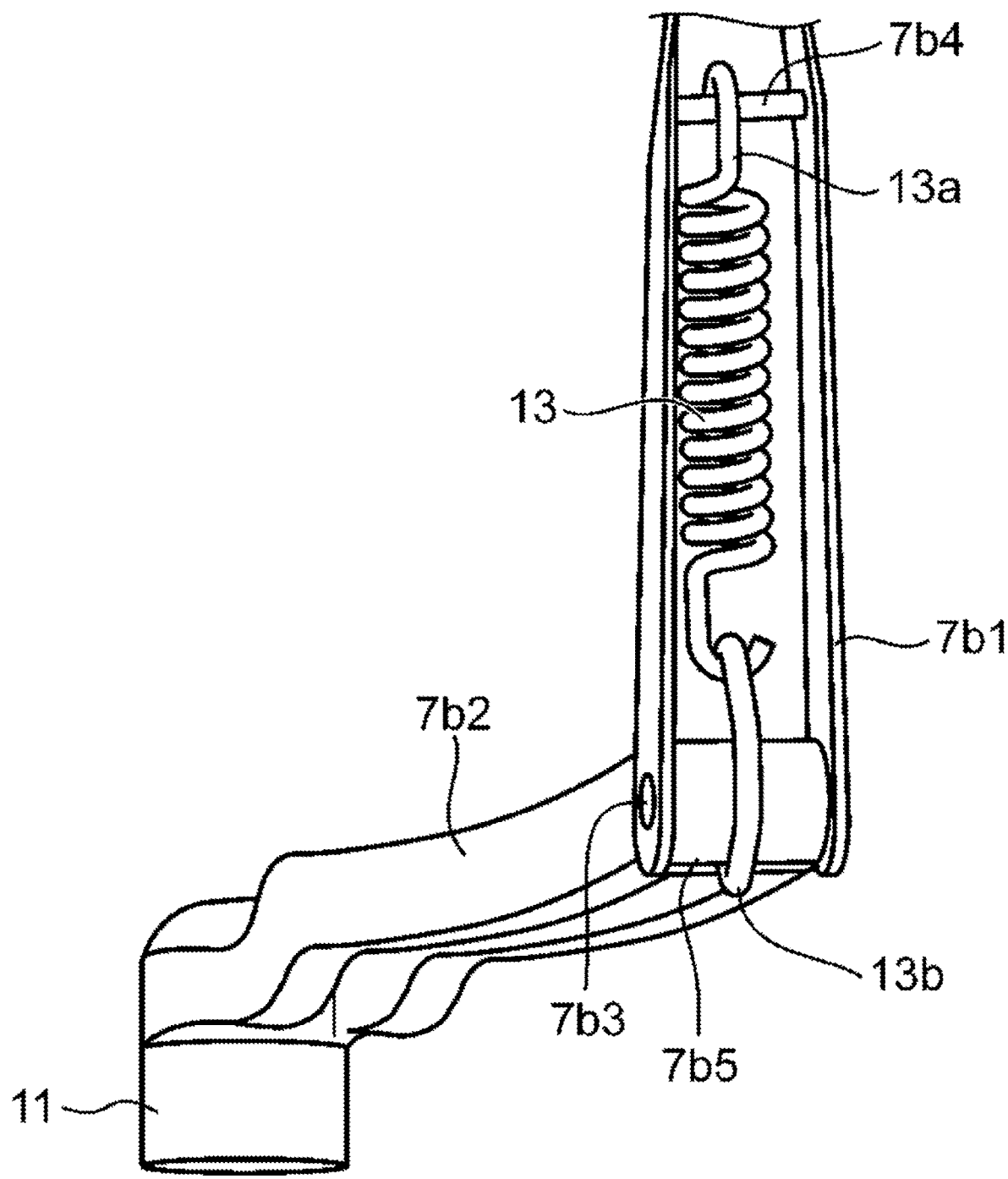
FIG. 7 is an enlarged perspective view of a tension coil spring provided to a wiper arm of the first wiper in FIG. 6 and portions around the tension coil spring.

In the present embodiment, the wiper arm 7b of the first wiper 7 is provided with a tension coil spring 13 as shown in FIGS. 6 and 7. The tension coil spring 13 serves as urging means to urge the wiper arm 7b from the retreat position PB to the base position PA. One end 13a of the tension coil spring 13 engages an engaged portion 7b4 provided to the distal end portion 7b1 of the wiper arm 7b, and the other end 13b engages an engaged portion 7b5 of the hinge portion 7b3. With this configuration, when the wiper arm 7b is raised and positioned at the retreat position PB, or specifically, in the state where the wiper arm 7b is bent at the hinge portion 7b3 and its distal end portion 7b1 is raised as shown in FIGS. 6 and 7, the tension coil spring 13 remains stretched between the two engaged portions 7b4, 7b5 (specifically, the tension coil spring 13 remains stable without being compressed past the neutral point toward the retreat position PB side). On the other hand, when the distal end portion 7b1 of the wiper arm 7b receives reaction force from the back end 4a of the engine hood 4, the tension coil spring 13 can be compressed past the neutral point toward the base position PA side, whereby the wiper arm 7b is urged from the retreat position PB to the base position PA (i.e., the distal end portion 7b1 is urged to fall). This more reliably ensures that the wiper arm 7b returns to the base position PA.

Description of the Second Wiper 8

The second wiper 8 basically has the same configuration as the first wiper 7. That is, as shown in FIGS. 2-4, the second wiper 8 includes a wiper blade 8a that wipes the windshield 3 and a wiper arm 8b having the wiper blade 8a attached to its distal end and capable of swinging about a predetermined second pivot shaft 12 along the surface of the windshield 3 together with the wiper blade 8a. The second pivot shaft 12 has the wiper arm 8b fixed thereto and is rotatably mounted on the vehicle body component 6 in FIGS. 2-4 at its portion closer to the center in the vehicle width direction than the first pivot shaft 11 is.

The second wiper 8 has a configuration enabling the lock back similarly to the first wiper 7, i.e., enabling the lock back whereby the wiper arm 8b is moved from a base position at which the wiper blade 8a is made to contact the windshield 3, to a retreat position at which the wiper blade 8a is raised and held away from the windshield 3. Specifically, the wiper arm 8b is configured to bend in the normal direction (outward direction) of the windshield 3, and more specifically, the wiper arm 8b includes a distal end portion 8b1, a proximal end portion 8b2, and a hinge portion 8b3 providing a hinge connection between the distal end portion 8b1 and the proximal end portion 8b2.

As shown in FIGS. 1 and 2, the second wiper 8 is capable of swinging about the second pivot shaft 12 over a predetermined range along the surface of the windshield 3 and in conjunction with the swinging of the first wiper 7.

Similarly to the first wiper 7, the second wiper 8 is also provided with urging means (not shown), such as a tension coil spring, for urging from the retreat position to the base position.

Description of the Link Mechanism 10

The link mechanism 10 of the present disclosure is not limited to a specific configuration; the link mechanism 10 is only required to have a configuration capable of converting the rotational driving force generated from the drive part 9 into the driving force for a to-and-fro swinging motion and transmitting it to each of the first wiper 7 and the second wiper 8.

For example, the link mechanism 10 of the present embodiment shown in FIGS. 3 and 4 includes: an output shaft 10a that reduces the rotational driving force generated from the drive part 9 composed of an electric motor and outputs it, a first link bar 10b having one end thereof fixed to the output shaft 10a, a second link bar 10c having one end thereof link-coupled to the other end of the first link bar 10b, a third link bar 10d having a distal end thereof link-coupled to the other end of the second link bar 10c and having a base end thereof fixed to the first pivot shaft 11, a fourth link bar 10e having one end thereof link-coupled to the other end of the second link bar 10c (along with the distal end of the third link bar 10d), and a fifth link bar 10f having a distal end thereof link-coupled to the other end of the fourth link bar 10e and having a base end thereof fixed to the second pivot shaft 12.

The proximal end of the wiper arm 7b of the first wiper 7 and the base end of the third link bar 10d are fixed in common to the first pivot shaft 11. Since the first pivot shaft 11 is rotatably mounted on the vehicle body component 6, the wiper arm 7b and the third link bar 10d are capable of concurrently swinging about the first pivot shaft 11.

The proximal end of the wiper arm 8b of the second wiper 8 and the base end of the fifth link bar 10f are fixed in common to the second pivot shaft 12. Since the second pivot shaft 12 is rotatably mounted on the vehicle body component 6, the wiper arm 8b and the fifth link bar 10f are capable of concurrently swinging about the second pivot shaft 12.

With the above configuration of the link mechanism 10, when the drive part 9 rotates in a predetermined direction, the rotational driving force is transmitted via the output shaft 10a of the link mechanism 10 to the first to fifth link bars 10b-10f link-coupled to each other. Thus, the wiper arm 7b of the first wiper 7 is capable of swinging about the first pivot shaft 11 to and from between the upper reversal position P1 and the lower reversal position P2 and, along with this, the wiper arm 8b of the second wiper 8 is also capable of swinging about the second pivot shaft 12 to and from between a predetermined upper reversal position and a predetermined lower reversal position provided for the second wiper 8.

Description of the Controller 21

Figure 8:
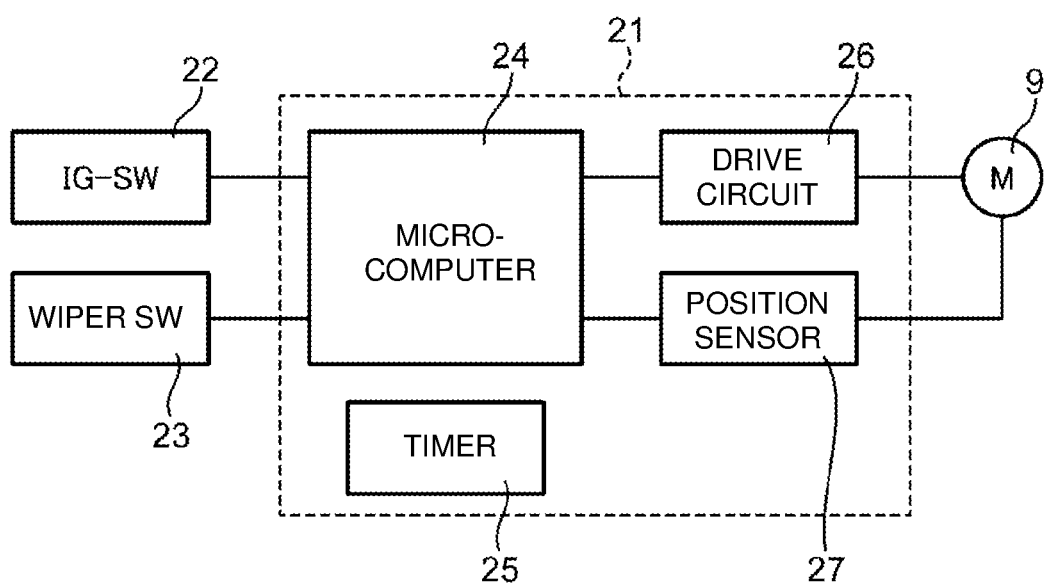
FIG. 8 is a block diagram illustrating a system configuration of the wiper control apparatus according to one embodiment of the present disclosure.

As shown in FIG. 8, in the present embodiment, the wiper control apparatus 5 includes the controller 21 that controls driving of the drive part 9. The wiper control apparatus 5 further includes the ignition switch (IG-SW) 22 that turns on and off a vehicle power unit (e.g., an engine) and the wiper switch (wiper SW) 23 as input means to feed input signals to the controller 21 (specifically, a microcomputer 24 described later). The wiper switch 23 is a switch for switching operations of the first wiper 7 and the second wiper 8. For example, the wiper switch 23 is capable of switching operation modes between continuous swing (low speed/high speed), intermittent swing, mist (swing only once), stop, and the like.

As shown in FIG. 8, the controller 21 of the present embodiment includes a microcomputer 24 provided with a central processing unit (CPU), a memory and the like, a timer 25 for measuring time intervals, a drive circuit 26 that applies a drive current or a drive voltage to the drive part 9 in response to commands from the microcomputer 24, and a position sensor 27 that detects a rotational position of the output shaft of the motor constituting the drive part 9 and sends signals detected to the microcomputer 24.

In response to a predetermined signal for the lock back from the ignition switch 22 and the wiper switch 23 (e.g., a unique signal generated by successive turning on and off of the ignition switch 22 followed by pushing twice of the wiper switch 23 at the mist position), the controller 21 controls the drive part 9 to move the first wiper 7 at the parked position PC to the service position PS and stop it there. At the service position PS, the first wiper 7 can have the wiper arm 7b raised from the windshield 3 and locked back without being interfered with the back end 4a of the engine hood 4. At this time, the second wiper 8 also moves to a predetermined service position PS, so that the second wiper 8 can be locked back too.

In response to a predetermined signal for a parking operation from the ignition switch 22 and the wiper switch 23 (e.g., a unique signal generated by turning on of the ignition switch 22 followed by pushing once of the wiper switch 23 at the mist position) with the first wiper 7 at the service position PS while the vehicle is parked, the controller 21 of the present embodiment controls the drive part 9 to perform the parking operation of parking the first wiper 7 into the parked position PC (see FIGS. 2-5). Concurrently with the first wiper 7, the second wiper 8 is also parked into a predetermined parked position concealed by the back end 4a of the engine hood 4.

When performing the parking operation for the first wiper 7, the controller 21 of the present embodiment controls the drive part 9 as follows:

First, the controller 21 controls the drive part 9 to perform the parking operation of swinging the wiper arm 7b of the first wiper 7 downward to park the first wiper 7 into the predetermined parked position PC located below the lower reversal position P2 and between the back end 4a of the engine hood 4 and the windshield 3, as shown in FIGS. 2-4.

When the wiper arm 7b is positioned above the parked position PC and at the retreat position PB during the parking operation and while the wiper arm 7b is being swung downward toward the lower reversal position P2, the controller 21 controls the drive part 9 to stop the wiper arm 7b for a predetermined time interval (e.g., about 0.5 seconds to about 2 seconds) at the predetermined pause position P3 at which the wiper arm 7b can fall toward the windshield 3 to return to the base position PA.

Further, the controller 21 controls the drive part 9 to swing the wiper arm 7b to the parked position PC after a lapse of the predetermined time interval.

Description of the Wiper Control Method

Now a description will be given of the wiper control method according to an embodiment of the present disclosure, using as an example the above parking operation for the first wiper 7 and with reference to the flowchart of FIG. 9 for more details.

First, when the controller 21 receives the aforementioned predetermined signal for the parking operation from the ignition switch 22 and the wiper switch 23 with the first wiper 7 at the service position PS while the vehicle is parked, the wiper parking operation is initiated. At this time, the controller 21 controls the drive part 9 to perform the parking operation of parking the first wiper 7 into the parked position PC (see FIGS. 2-5).

Figure 9:
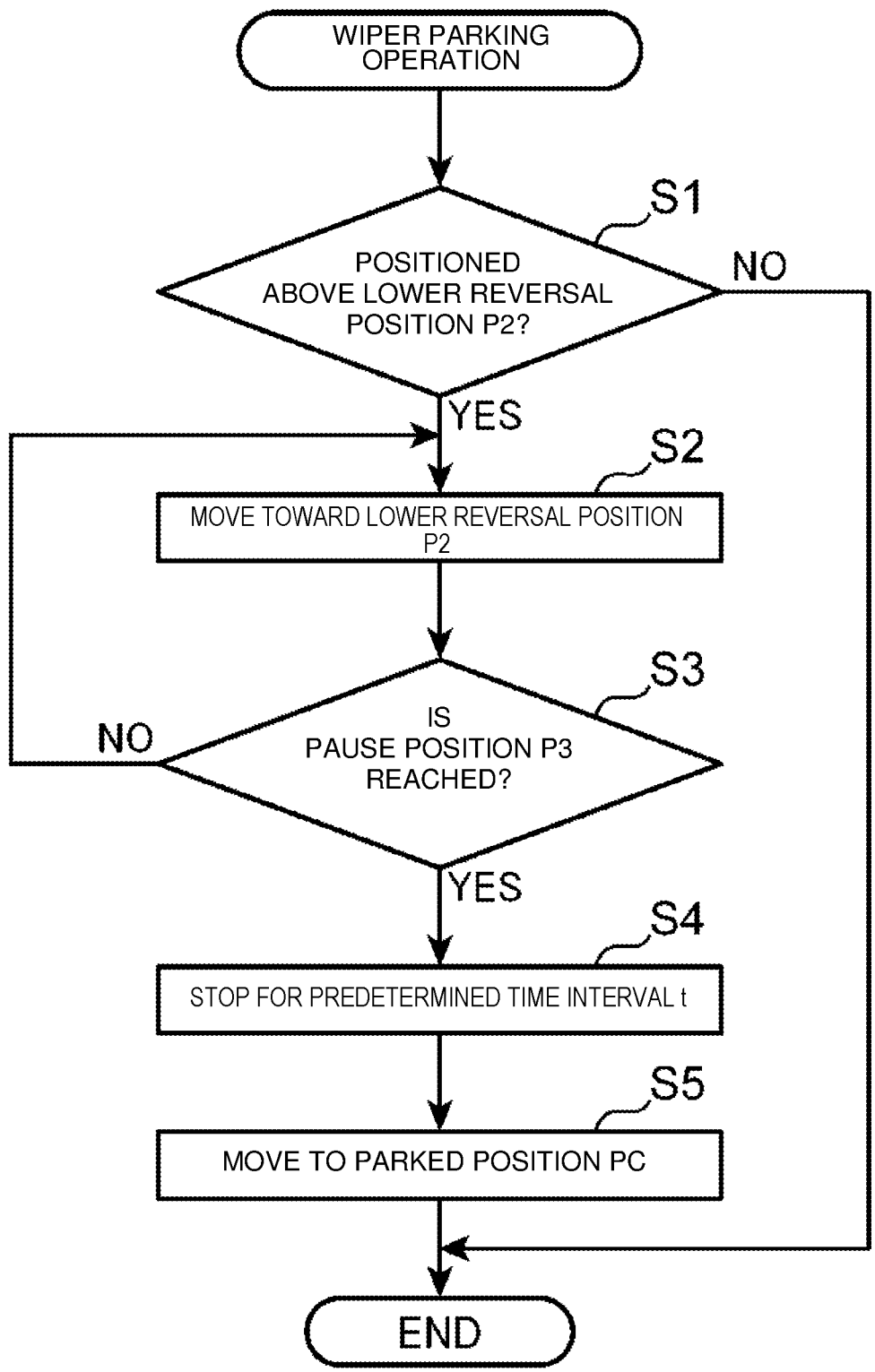
FIG. 9 is a flowchart illustrating a procedure of the wiper control method according to one embodiment of the present disclosure.

As the wiper parking operation described below, a predetermined operation shown in FIG. 9 is performed regardless of whether the wiper arm 7b is in the lock-back state.

As the first step of the wiper parking operation, the controller 21 determines at step S1 in FIG. 9 whether the wiper arm 7b being swung downward toward the lower reversal position P2 is positioned above the lower reversal position P2, based on detection signals from the position sensor 27. If the controller 21 determines that the wiper arm 7b is positioned above the lower reversal position P2, the operation goes to step S2, where the controller 21 controls the drive part 9 to move the wiper arm 7b of the first wiper 7 toward the lower reversal position P2, or more specifically, swing the wiper arm 7b downward. On the other hand, if the controller 21 does not determine that the wiper arm 7b is not positioned above the lower reversal position P2, the parking operation is terminated.

While the wiper arm 7b is being swung downward toward the lower reversal position P2 during the parking operation of parking the first wiper 7 into the parked position PC, if the controller 21 determines, based on detection signals from the position sensor 27, that the wiper arm 7b has reached the predetermined pause position P3 located above the parked position PC (step S3), the operation goes to step S4, where the controller 21 controls the drive part 9 to stop the wiper arm 7b for a predetermined time interval t (about 0.5 seconds to about 2 seconds). The controller 21 measures the predetermined time interval t using the timer 25.

Here, the pause position P3 may be any position that enables the wiper arm 7b at the retreat position PB raised from the windshield 3 to fall toward the base position PA, as shown in FIGS. 3 and 4. Thus, when the wiper arm 7b has reached the pause position P3, the wiper arm 7b may be intentionally made to contact the back end 4a of the engine hood 4 to facilitate and ensure the falling of the wiper arm 7b, as described below.

That is, in the present embodiment, the pause position P3 is set within a predetermined range at or below a position at which the wiper arm 7b changes from a non-contacting state to a contacting state with respect to the back end 4a of the engine hood 4 when the wiper arm 7b in the lock-back state, i.e., the wiper arm 7b raised and held away from the windshield 3 at the retreat position PB is swung toward the parked position PC. In this case, at the pause position P3, the wiper arm 7b in the lock-back state can contact the back end 4a of the engine hood 4 and thus fall from the retreat position PB toward the base position PA.

Further, in the present embodiment, the above predetermined range is set to a range within which the wiper arm 7b receives, upon contacting the back end 4a of the engine hood 4, reaction force equal to or greater than a predetermined magnitude from the engine hood 4 toward the windshield 3. This ensures that the wiper arm 7b in the lock-back state falls toward the windshield 3.

Additionally, in the present embodiment, when the wiper arm 7b at the retreat position PB receives the reaction force from the back end 4a of the engine hood 4, the tension coil spring 13 provided to the wiper arm 7b urges the wiper arm 7b from the retreat position PB to the base position PA. This more reliably ensures that the wiper arm 7b falls toward the windshield 3.

The above predetermined range may be set to a range that at least ensures that the wiper blade 7a does not contact the back end 4a of the engine hood 4 when the wiper arm 7b falls toward the windshield 3 and returns to the base position PA. In this case, torsion of the wiper blade 7a and any resultant damage to the windshield 3 can be reliably prevented.

After a lapse of the above predetermined time interval t, the controller 21 controls the drive part 9 to swing the wiper arm 7b to the parked position PC at step S5. Thus, the wiper parking operation is completed.

The wiper control method of the present embodiment is for a wiper apparatus including: the first wiper 7 including the wiper blade 7a that wipes the windshield 3 of the vehicle 1 and the wiper arm 7b that has the wiper blade 7a attached thereto and is capable of swinging about the predetermined first pivot shaft 11 along the surface of the windshield 3 together with the wiper blade 7a; and the drive part 9 that swings the first wiper 7 along the surface of the windshield 3 to-and-fro between the predetermined upper reversal position P1 and the predetermined lower reversal position P2. The wiper apparatus has a configuration capable of enabling lock back whereby the wiper arm 7b is moved from the base position PA at which the wiper blade 7a is made to contact the windshield 3, to the retreat position PB at which the wiper blade 7a is raised and held away from the windshield 3, and capable of parking the first wiper 7 into the predetermined parked position PC located below the lower reversal position P2 and between the back end 4a of the engine hood 4 and the windshield 3.

When the wiper arm 7b is positioned above the parked position PC and at the retreat position PB during the parking operation of parking the first wiper 7 into the parked position PC and while the wiper arm 7b is being swung downward toward the lower reversal position P2, the above wiper control method stops the wiper arm 7b for a predetermined time interval at the predetermined pause position P3 at which the wiper arm 7b can fall toward the windshield 3 to return to the base position PA. After a lapse of the predetermined time interval, the method swings the wiper arm 7b to the parked position PC.

To implement the above wiper control method, the wiper control apparatus 5 of the present embodiment includes the controller 21 that controls driving of the drive part 9. The controller 21 controls the drive part 9 to perform the parking operation of parking the first wiper 7 into the predetermined parked position PC located below the lower reversal position P2 and between the back end 4a of the engine hood 4 and the windshield 3. Additionally, when the wiper arm 7b is positioned above the parked position PC and at the retreat position PB during the parking operation and while the wiper arm 7b is being swung downward toward the lower reversal position P2, the controller 21 controls the drive part 9 to stop the wiper arm 7b for a predetermined time interval at the predetermined pause position P3 at which the wiper arm 7b can fall toward the windshield 3 to return to the base position PA. Further, after a lapse of the predetermined time interval, the controller 21 controls the drive part 9 to swing the wiper arm 7b to the parked position PC.

With the above wiper control method and wiper control apparatus 5, even when the wiper arm 7b is in the lock-back state, i.e., the state where the wiper arm 7b is at the retreat position PB with the wiper blade 7a raised and held away from the windshield 3, the wiper arm 7b can be stopped for a predetermined time interval at the predetermined pause position P3 located above the parked position PC during the parking operation of parking the first wiper 7 into the parked position PC between the back end 4a of the engine hood 4 and the windshield 3 and while the wiper arm 7b is being swung downward toward the lower reversal position P2. This enables, during the predetermined time interval, the wiper arm 7b to fall from the retreat position PB toward the windshield 3 and return to the base position PA at which the wiper blade 7a contacts the windshield 3, and then enables the wiper arm 7b to swing to the parked position PC to move the wiper blade 7a to the parked position PC.

Figure 10:
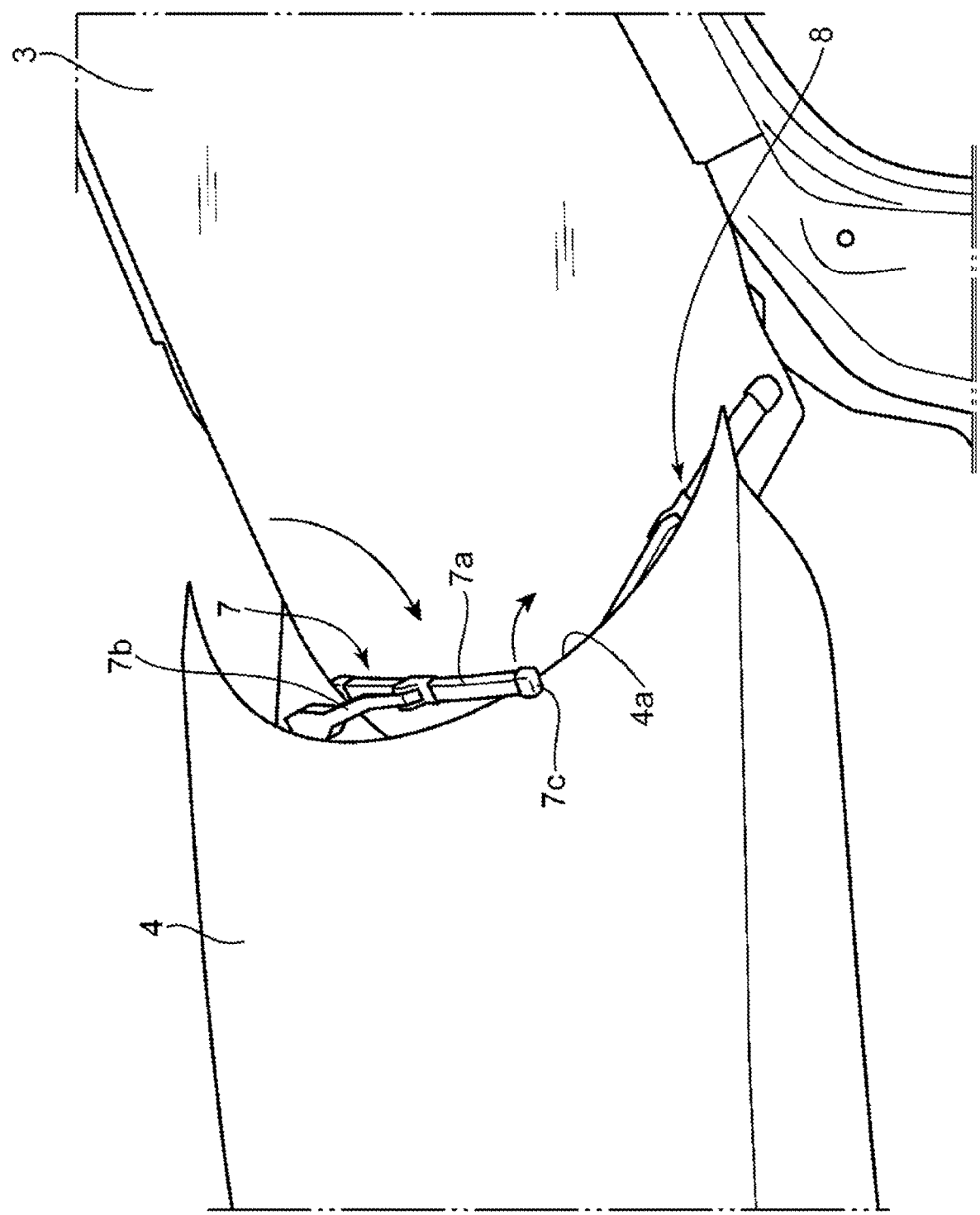
FIG. 10 illustrates how the wiper blade contacts the back end of the engine hood when a conventional wiper control apparatus performs the wiper parking operation while the wiper arm is in the lock-back state.

When the wiper arm 7b falls toward the windshield 3 to return from the retreat position PB to the base position PA, the wiper arm 7b is not swinging toward the parked position PC. This avoids a situation where the wiper blade 7a contacts the back end 4a of the engine hood 4 (see FIG. 10), which would occur in conventional techniques. This in turn avoids a situation where the wiper blade 7a is twisted by contact with the back end 4a of the engine hood 4 and falls toward the windshield 3, preventing contact between the end portion of the wiper blade 7a (e.g., the cap 7c at the distal end of the wiper blade 7a shown in FIG. 10 (specifically, a hard cap made of e.g., ceramics)) and the windshield 3 and preventing any damage to the windshield 3 that may otherwise result from an impact of the contact.

In the wiper control method and the wiper control apparatus 5 of the present embodiment, the pause position P3 is provided within a predetermined range below the position at which the wiper arm 7b comes to a contacting state with respect to the back end 4a of the engine hood 4 when the wiper arm 7b at the retreat position PB swings toward the parked position PC.

With this feature, during the parking operation and when the wiper arm 7b in the lock-back state, i.e., at the retreat position PB is swung downward toward the lower reversal position P2 and then reaches the pause position P3, the wiper arm 7b can contact the back end 4a of the engine hood 4 and fall from the retreat position PB toward the base position PA. This eliminates the need for a special mechanism to cause the wiper arm 7b to fall toward the windshield 3.

In the wiper control method and the wiper control apparatus 5 of the present embodiment, the above predetermined range within which the pause position P3 is set is a range within which the wiper arm 7b receives, upon contacting the back end 4a of the engine hood 4, a reaction force equal to or greater than a predetermined magnitude from the back end 4a of the engine hood 4 toward the windshield 3.

With this feature, the wiper arm 7b at the pause position P3 receives the reaction force from the back end 4a of the engine hood 4, and this ensures that the wiper arm 7b falls toward the windshield 3.

When the wiper arm 7b at the retreat position PB receives the reaction force from the back end 4a of the engine hood 4, the wiper control method of the present embodiment urges the wiper arm 7b from the retreat position PB to the base position PA with the tension coil spring 13 as urging means provided to the wiper arm 7b.

The wiper control apparatus 5 of the present embodiment further includes the tension coil spring 13 provided to the wiper arm 7b and serving as urging means to urge the wiper arm 7b from the retreat position PB to the base position PA when the wiper arm 7b at the retreat position PB receives the reaction force from the back end 4a of the engine hood 4.

The above wiper control method and wiper control apparatus 5 more reliably ensures the falling of the wiper arm 7b toward the windshield 3 as the wiper arm 7b not only receives the reaction force from the back end 4a of the engine hood 4 but also receives an urging force from the tension coil spring 13 as urging means.

In the wiper control method and the wiper control apparatus 5 of the present embodiment, the above predetermined range is a range within which the wiper blade 7a does not contact the back end 4a of the engine hood 4 when the wiper arm 7b falls toward the windshield 3 and returns to the base position PA.

With this feature, torsion of the wiper blade 7a and any resultant damage to the windshield 3 can be reliably prevented.

As described above, in the wiper control method and the wiper control apparatus 5 of the present embodiment, the above predetermined range within which the pause position P3 is set as follows. The above predetermined range may be within a range of positions starting after the contact between the wiper arm 7b in the lock-back state and the back end 4a of the engine hood 4 and, as the case where the degree of the contact is smallest (as the case of a so-called lower limit of the predetermined range), may be set to a range of positions within which the wiper blade 7a does not contact the back end 4a of the engine hood 4 when the wiper arm 7b falls toward the windshield 3 and returns to the base position PA. This can reliably prevent torsion of the wiper blade 7a and any resultant damage to the windshield 3. As the case where the degree of the contact is largest (as the case of a so-called upper limit of the predetermined range), the predetermined range may be set to a range of positions within which the wiper arm 7b in the lock-back state receives, upon contacting the back end 4a of the engine hood 4, a reaction force equal to or greater than a predetermined magnitude from the engine hood 4 toward the windshield 3. This ensures that the wiper arm 7b falls toward the windshield 3.

Modifications (A) While in the above embodiment, the pause position P3 is located above the lower reversal position P2, the present disclosure is not limited to this pause position. The pause position P3 may be located below the lower reversal position P2. However, when the pause position P3 is located above the lower reversal position P2, the wiper arm at the pause position P3 is positioned upwardly away from the back end 4a of the engine hood 4 more than when the wiper arm is at the lower reversal position P2. This can reliably avoid a situation where the wiper blade 7a contacts the back end 4a of the engine hood 4 when the wiper arm 7b falls toward the windshield 3 and returns from the retreat position PB to the base position PA.

(B) In the above embodiment, the pause position P3 is set within the predetermined range after the wiper arm 7b raised and held away from the windshield 3 at the retreat position PB (i.e., in the lock-back state) changes from a non-contacting state to a contacting state with respect to the back end 4a of the engine hood 4 by swinging toward the parked position PC. However, the present disclosure is not limited to this pause position range.

According to the present disclosure, the pause position P3 may be any position at which the wiper arm 7b at the retreat position PB raised from the windshield 3 can fall toward the base position PA, as shown in FIGS. 3 and 4. Hence, in certain embodiments of the present disclosure, the pause position P3 is a position at which the wiper arm 7b can fall from the retreat position PB toward the base position PA by the weight of the first wiper 7 without contacting the back end 4a of the engine hood 4. In this case too, any damage to the windshield 3 during the wiper parking operation can be prevented that may otherwise occur by falling of the wiper blade 7a.

What is claimed is:

1. A wiper control method for a wiper apparatus which includes a wiper having a wiper blade that wipes a windshield of a vehicle and a wiper arm that has the wiper blade attached thereto and is capable of swinging about a predetermined pivot shaft along a surface of the windshield together with the wiper blade, and a drive part that causes the wiper to swing along the surface of the windshield to and from between a predetermined upper reversal position and a predetermined lower reversal position, wherein the wiper apparatus has a configuration capable of enabling lock back whereby the wiper arm is moved from a base position at which the wiper blade is made to contact the windshield to a retreat position at which the wiper blade is raised and held away from the windshield, and capable of parking the wiper at a predetermined parked position located below the lower reversal position and between a back end of an engine hood and the windshield, the method comprising: stopping the wiper arm for a predetermined time interval at a predetermined pause position when the wiper arm is positioned above the parked position and at the retreat position during a parking operation of parking the wiper at the parked position and while the wiper arm is being swung downward toward the lower reversal position, the pause position being a position at which the wiper arm is able to fall toward the windshield to return to the base position; and swinging the wiper arm to the parked position after a lapse of the predetermined time interval, wherein the pause position is located within a predetermined range at or below a position at which the wiper arm comes to a contacting state with respect to the back end of the engine hood when the wiper arm at the retreat position swings toward the parked position.

2. The wiper control method according to claim 1, wherein the predetermined range is set to a range within which the wiper arm receives, upon contacting the back end of the engine hood, a reaction force equal to or greater than a predetermined magnitude from the back end of the engine hood toward the windshield.

3. The wiper control method according to claim 2, further comprising urging the wiper arm from the retreat position to the base position with urging means provided to the wiper arm when the wiper arm at the retreat position receives the reaction force from the back end of the engine hood.

4. The wiper control method according to claim 2, wherein
the predetermined range is set to a range within which the wiper blade does not contact the back end of the engine hood when the wiper arm falls toward the windshield to return to the base position.

5. The wiper control method according to claim 3, wherein
the predetermined range is set to a range within which the wiper blade does not contact the back end of the engine hood when the wiper arm falls toward the windshield to return to the base position.

6. The wiper control method according to claim 1, wherein the predetermined range is set to a range within which the wiper blade does not contact the back end of the engine hood when the wiper arm falls toward the windshield to return to the base position.

7. The wiper control method according to claim 1, wherein the lower reversal position is located above the parked position by about 3 degrees of swing of the wiper arm about the pivot shaft.

8. The wiper control method according to claim 1, wherein the pause position is located above the parked position by about 5.5 degrees of swing of the wiper arm about the pivot shaft.

* * * * *